United States Patent Office 3,355,933
Patented Dec. 5, 1967

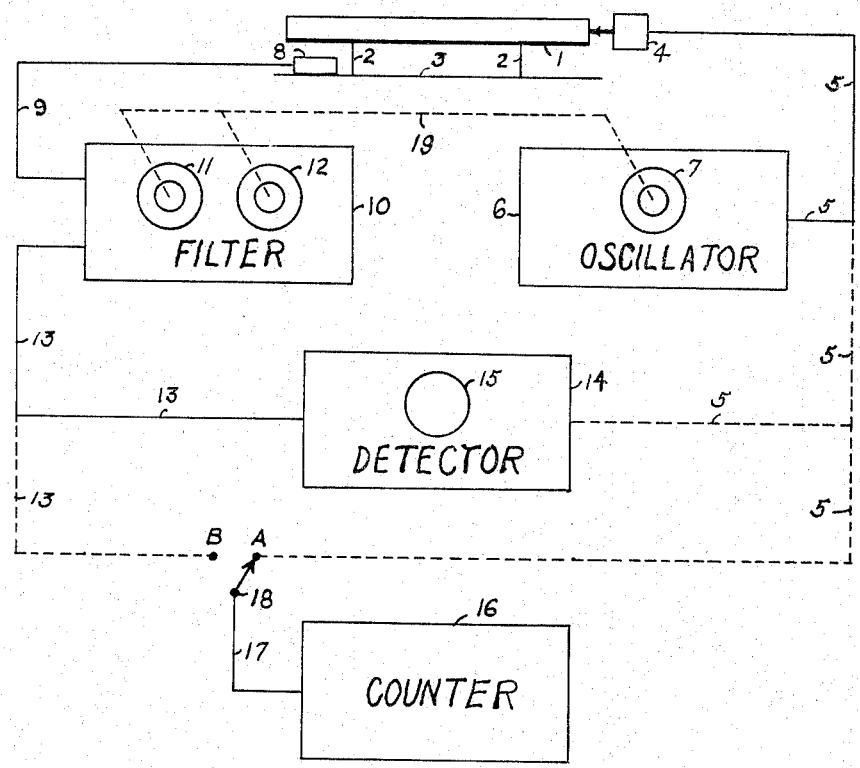

3,355,933
RESONANCE VIBRATION TESTING APPARATUS
Robert G. Rowe, 8237 Witkop Ave.,
Niagara Falls, N.Y. 14304
Filed Mar. 16, 1964, Ser. No. 351,984
4 Claims. (Cl. 73—67.2)

This invention relates to apparatus for testing and comparing the mechanical properties and physical characteristics of articles or bodies from their vibrations and, more particularly, to improved apparatus for measuring characteristics of their natural frequency vibrations.

I have described a number of aspects of the theory and practice of resonance vibration testing in a number of articles and patents in the prior art, including:
1. "Vibration Apparatus for Testing Articles," U.S. Patent No. 2,486,984 issued Nov. 1, 1949.
2. "Sonic Tests Grade Abrasive Wheels," Steel, June 26, 1950, volume 126, page 74.
3. "Testing Abrasive Wheels With the Sonic Comparator," Non-Destructive Testing, Fall number, 1951, page 29.
4. "Natural Frequency Vibration Tests," Non-Destructive Testing Handbook, volume II, Section 51, Ronald Press Company, New York, New York (1959).
5. "Method and Apparatus for Damped Wave Analysis," U.S. Patent No. 3,019,387 issued Jan. 30, 1962.
6. "Vibration Apparatus for Testing Articles," U.S. Patent No. 3,059,468 issued Oct. 23, 1962.

Additional information is contained in my copending application Serial No. 339,183 filed Jan. 21, 1964, both entitled "Resonance Vibration Apparatus for Testing Articles."

The first reference listed above describes in detail an apparatus for exciting and measuring the natural frequencies of resonance vibration in articles. Both in United States and abroad this apparatus, known commercially as the "Sonic Comparator," has been successful as a quality control instrument to detect similarities and differences in the properties of articles of manufacture. Such articles include numerous items of solid and elastic character such as bonded abrasive products, carbon and graphite bodies, ceramic articles, refractory brick, sintered metals and the like.

In the apparatus illustrated and described in this reference, U.S. Patent No. 2,486,984 hereinafter called the "reference patent," the article to be tested is supported for a preferred mode of vibration. An electromechanical transducer, driven from a frequency-calibrated variable frequency oscillator, applies vibrational energy in the form of forcing vibrations to the article over a desired frequency range. A mechanoelectrical transducer or microphone produces, from vibrations of the article, an electric signal the frequency of which equals the vibrational frequency of the article. An oscilloscope, connected to the microphone and to the variable frequency oscillator, detects whether or not the forcing frequency of the calibrated oscillator equals the natural frequency of resonance vibration of the article. As fully explained in the reference patent, the oscillator may be tuned until the oscilloscope resonance detector indicates that such resonance vibrations obtain. At this point the frequency indicated by the dial of the calibrated oscillator is the natural frequency of resonance vibration of the article under test.

While the operation of the apparatus has been most satisfactory in a wide variety of applications, there are certain industrial conditions which restrict or prevent its successful use. These conditions are, unfortunately, rather prevalent in industry. Specifically, if the ambient noise level is too high in the location or area in which it is desired to use the instrument, the oscilloscopic resonance pattern is so severely distorted that it is impossible to detect resonance and, hence, determine the natural frequency of resonance vibrations of articles with the equipment. As indicated in the reference patent, the microphone of the apparatus generates an electric signal of a frequency equal to the frequency of vibration of the article under test. Those familiar with the art will appreciate that the microphone also will generate electric signals characteristic of the ambient noise and that, if the sound pressure of the noise is stronger at the microphone than the sound pressure of the article vibrations, the "noise" signals will be capable of masking the "article" signals. In one industrial application involving measurements on abrasive grinding wheels, the noise which affected the operation originated from the steel wheels of small carts carrying heavy loads of grinding wheels across the concrete floor near the instrument.

In a first effort to solve this problem it was recommended that the instrument be moved to a quieter location. Objections were raised to this proposed solution, however, to the effect that the instrument could not be moved to just any site because the test must be applied at a particular site amenable to the "flow" through the plant of the products to be tested. To locate the instrument elsewhere would increase the time and cost for intraplant product transportation to and from the instrument, both untenable extravagances.

In a second attempt to solve the problem it was recommended that a sound-proof room be constructed at the site chosen for application of the test. Objections were raised to this second solution, however, to the effect that the special room would be too expensive and that getting the product in and out of the sound-proof door, for example, would restrict the freedom and retard the orderly flow of the product.

In a third attempt to solve the problem a vibration pickup was substituted for the microphone of the apparatus in accord with the reasoning that the vibration pickup would be less sensitive to the airborne noise. Unfortunately, however, the expected improvement did not materialize. The passage of the same heavily-loaded carts induced vibrations in the concrete floor which were transmitted through the floor-supported instrument and its article supports to the abrasive wheel and, hence, to the vibration pickup. These induced spurious vibrations, in this case, were stronger than the natural frequency vibrations of the grinding wheels under test, and, again, the undesired structural vibration "noise" signals masked the desired resonance vibration "abrasive wheel" signals so that the resonance frequencies of the wheels could not be determined.

It is, therefore, an object of the present invention to provide apparatus for testing articles by resonance vibrations which is less sensitive to ambient sound and vibration.

Another object of the invention is to provide apparatus which will test articles in noisy, as well as quiet, locations.

Still another object of the invention is to provide apparatus which permits the use of article vibrations of lower amplitude.

A further object is to provide apparatus which can employ lower-powered vibration excitation components.

Still a further object is to provide, as a new and integral electronic instrument, a combined variable frequency oscillator and variable frequency filter.

These objects, and ancillary objects which may become apparent as the description proceeds, I have found that I can accomplish in short by novel methods and apparatus involving the employment of a bandpass or a single-frequency filter in combination with other elements. The novel features which I believe to be characteristic of my invention are engendered with particularity in the appended claims. The invention itself, however, best will be understood by reference to the accompanying description and drawing in which the single figure is arranged to illustrate diagrammatically several modifications of a preferred embodiment of the invention.

With reference to the single figure, article 1 being tested, which may be a grinding wheel for example, is shown resting on supports 2 attached to table 3. Location of the supports at nodes of vibration of the article to reduce damping of the vibrations is covered in detail in the prior art. It will be recognized that article 1, supports 2 and table 3 of the present invention may be likened, respectively, to specimen S, supports 22 and table 19 of the reference patent.

In the drawing, electromechanical transducer 4 is shown with its vibratory stylus touching article 1 in order to impart electrically generated mechanical vibrations thereto. Such a vibration exciting means as transducer 4 may be a Model M41–500 Magnetic Recording Head as manufactured by the Astatic Corporation, Conneaut, Ohio, for example. In turn, the electrical input of transducer 4 is shown connected through lead wire 5 from the output of calibrated variable frequency oscillator 6, the latter generating the current which electromagnetically excites vibrations in the stylus of the transducer and, hence, in the article. Variable frequency oscillator 6 is shown provided with dial 7 arranged for rotation to vary or adjust the output frequency in a continuous fashion over the operating frequency range of interest. Further, dial 7 is calibrated in frequency in cycles per second to enable reading the output frequency of the variable frequency oscillator. Conveniently, oscillator 6 may be a Model 200AB Audio Oscillator manufactured by the Hewlett-Packard Company, Palo Alto, California, for example. Naturally, oscillator 6 will be selected to produce alternating currents covering the frequency range of the natural frequencies of resonance vibration of the articles to be tested. Transducer 4, lead wire 5, oscillator 6 and dial 7 may be compared to vibrating means 18, lead wires 7 and 17, oscillator 1 and tuning dial 2 of the reference patent.

Further, in the figure, mechanoelectrical transducer 8 is shown resting on table 3 proximate to article 1 in order to receive sound waves generated by the vibrations of article 1 and to convert them into alternating current signals of equivalent frequency. In this illustration transducer 8 may be a conventional microphone, acoustically coupled to article 1. In apparatus of the type being described, I have used both the Model JT–30 Microphone and the Model 51–1 Phonograph Pickup manufactured by the hereinbefore identified Astatic Corporation for transducer 8. It will be appreciated by those versed in the art that connection between the article and either transducer 4 or 8 may be acoustic, mechanical, electromagnetic, electrostatic or otherwise, dictated in part by the properties of the articles, the coupling method best fitted to the testing operation and the particular type of transducer it is desired to employ. As will be apparent, transducer 8 of the present invention may be compared with microphone 23 of the reference patent.

In the drawing, transducer 8 is shown electrically connected by lead wire 9 to the input of filter 10. Filter 10 may be a bandpass filter such as the Model 310–AB Variable Electronic Bandpass Filter manufactured by the Krohn-Hite Corporation, Cambridge, Massachusetts, for example. Typically, such filters are provided with two dials, as illustrated by dials 11 and 12 in the drawing, each calibrated in frequency in cycles per second not unlike dial 7 of oscillator 6. One dial sets the lower limit of the pass band and the other dial sets the upper limit of the pass band. In the pass band, between the adjustable lower and upper frequency limits, such filters have approximately zero insertion loss. In other words, signals applied to the input terminals of the filter which have frequencies falling within the pass band, defined by the pre-adjusted lower and upper frequency limits, are passed to the output terminals of the filter with substantially no attenuation. On the other hand, signals applied to the input of the filter which have frequencies falling below or above the pass band do not reach the output of the filter without attenuation.

For example, the lower limit of the pass band might be set at 1800 cycles per second with dial 11 and upper limit at 2200 cycles per second with dial 12. The width of the pass band would be 400 cycles per second. Signal frequencies lying between 1800 and 2200 cycles per second would be passed from the input to the output terminals of the filter substantially without attenuation, whereas those lying outside those limits would be attenuated. In the specifications of the commercial filter identified hereinbefore, attenuation in the pass band is rated at zero decibels, plus or minus one decibel. Outside the pass band, attenuation increases at a rate of 24 decibels per octave.

As another example, the lower limit of the pass band might be set at 1800 cycles per second with dial 11 and the upper limit also set at 1800 cycles per second with dial 12. As the lower and upper limits are the same, the width of the pass band would be zero cycles per second. Only signal frequencies of 1800 cycles per second would be passed from the input to the output terminals of the filter without attenuation. All other signal frequencies would be attenuated. In the event that this was to be the only mode of operation required, the two dials could be ganged together or the rotating elements all connected to one dial and the other eliminated. Rather than being termed a "Variable Electronic Bandpass Filter," the instrument might be termed a "Variable Electronic Single-Frequency Filter."

It will be apparent to those versed in the art that the reference patent neither illustrates nor describes any element which may be compared to filter 10 of the present invention.

Further, in the drawing, the output of filter 10 is shown connected by lead wire 13 to a first input of resonance detector 14, whereas the output of oscillator 6 is shown connected by solid and dashed sections of lead wire 5 to a second input of resonance detector 14. In this modification, detector 14 takes the form of a conventional cathode ray oscilloscope arranged to indicate resonance between the frequency of vibrations of article 1 and the frequency of the signals from the output of oscillator 6. The oscilloscope displays the phase and amplitude relationships of signals applied from transducer 8 to the vertical deflection plates and from oscillator 6 to the horizontal deflection plates of cathode ray tube 15.

Such oscilloscopes are well known to those versed in the art and include an input connected through a "vertical" amplifier to the vertical deflection plates of a cathode ray tube and an input connected through a "horizontal" amplifier to the horizontal deflection plates of the same cathode ray tube. The amplifiers serve to amplify signals applied to the input terminals sufficiently to enable them to deflect the electron beam of the cathode ray tube and are provided with manually adjustable gain controls to control the degree of amplification. Further, the amplifiers are known as "wide band" amplifiers, which indicates that they are capable of uniformly amplifying alternating current signals of a wide range of frequencies without unduly attenuating any frequencies in the range.

It will be apparent to those versed in the art that, in this modification, transducer 8, lead wires 9 and 13, resonance detector oscilloscope 14 and cathode ray tube (screen) 15, as well as calibrated oscillator 6 and solid and dashed sections of lead wire 5, may be likened to microphone 23, lead wires 24, oscilloscope 9, cathode ray tube screen 10, as well as calibrated oscillator 1 and lead wires 7 and 8, respectively, of FIGURE 1 of the reference patent.

The elements and the interconnection of the elements of the apparatus of a modification of a preferred embodiment of the present invention have been illustrated and described. Those elements of the present invention which may be compared to elements of the invention of the reference patent have been identified. In addition, the novel filter element of the present invention, as well as its novel interconnection with the prior art elements, has been illustrated and described. It remains to describe the novel apparatus engendered by the combination of the new element with the prior art elements, the modus operandi of the apparatus, the novel procedures for testing articles enabled by the apparatus and the novel results obtained.

These descriptions perhaps are best accomplished by pointing out the differences in the function, operational procedure and results of the new apparatus, as opposed to the prior art apparatus, particularly inasmuch as the latter already has been described at length in the reference patent.

Before proceeding with the description, however, it is to be pointed out that there are applications of the natural frequency resonance vibration test in which articles with frequencies falling within predetermined frequency limits are acceptable, whereas those with frequencies falling below or above the limits are unacceptable. Further, of the articles manifesting natural frequencies of resonance vibration within the predetermined acceptable frequency limits, determination of their exact frequencies may prove desirable in order to arrange these acceptable articles in sequence according to the exact magnitude of the particular characteristic or property which is known to vary with the natural frequency of vibration.

Further, as one of the objects of the invention is to provide apparatus for testing articles in the presence of noise, it is to be assumed that one or more sources of acoustical or vibrational noise is sufficiently proximate to the apparatus to produce signal energy at the mechanical input and electrical output of transducer 8 of sufficient intensity to interfere with the detection of the signal energy produced by resonance vibrations of the articles under test. A specific source of noise has not been illustrated in the drawing because of its many familiar forms. It is to be pointed out that noise generally covers a rather broad frequency spectrum, with the noise energy spread out over a substantial frequency range. On the other hand, the desired article resonance vibrations to be detected and measured are generally sine waves with their energy confined to a single frequency. In the apparatus being described, with the exception of filter 10 the frequency response of all other elements including the vibration detector characterized by transducer 8, as well as the resonance detector characterized by detector 14, purposely has been made very broad to give the apparatus extended capability of applying the test to many different articles. Articles of one type might be acceptable if their frequencies fell within 190 to 200 cycles per second, for example, whereas others might be acceptable if their frequencies fell within 19,000 to 19,500 cycles per second. Operation over a wide frequency range insures that the apparatus is adaptable to testing many different sizes and types of articles.

Returning to the description, article 1 in the drawing may be one of a series of articles being produced and to be tested in which it has been determined that articles of such a series are acceptable or unacceptable according to whether their natural frequencies for a particular mode of resonance vibration fall inside or outside, respectively, the frequency limits of 900 to 1100 cycles per second. Such a determination might be made ahead of time on like series of articles, for example, by correlating non-destructive frequency measurements performed with prior art apparatus and destructive physical measurements performed with modulus of rupture apparatus, or the like.

As these frequency limits have been determined in advance, in this case the pass band of band-pass filter 10 is adjusted to these limits. In other words, the lower frequency limit of band-pass filter 10 is adjusted to 900 cycles per second with dial 11, for example, and the upper frequency limit to 1100 cycles per second with dial 12.

Article 1 is positioned on supports 2 and in mechanical connection with the vibrating stylus of vibration exciting transducer 4, as well as in acoustical connection with vibration detecing transducer 8. Dial 7 of oscillator 6 may be tuned from somewhat below the 900 cycle per second low-frequency end of the predetermined frequency range toward the high-frequency end of the range. This action causes forcing vibrations of progressively increasing frequency to be applied to article 1 through transducer 4, the latter being driven from the output of oscillator 6.

Progressive tuning proceeds while observing screen 15 of oscilloscopic resonance detector 14 for the indication of resonance, described in the reference patent beginning in column 8, line 18 and again in column 9, line 22, which indicates the condition that the amplitude of vibration of article 1 is maximum and the frequency is equal to that of oscillator 6. Upon the indication of resonance, tuning ceases and the frequency of vibration of article 1 is determined by reading calibrated dial 7 of oscillator 6. Alternatively, should there be no indication of resonance, the natural frequency of article 1 falls outside the pass band and the article is to be rejected.

In apparatus of the general type being described, under conditions of substantial ambient noise the undesired acoustical and mechanical noise vibrations are converted to electric signals by the vibration detecting transducer along with the desired article vibrations. In the apparatus of the reference patent these two electric signals are connected directly to and displayed upon the oscilloscopic resonance detector. With this method and apparatus the oscilloscopic pattern of the undesired noise signals is so intense and randomly oriented as to completely distort, confuse and obscure the desired article vibration signals, and, hence, the required indication of resonance vibrations of article 1.

On the other hand, in the apparatus of the present invention, both electric signals are connected first to band-pass filter 10, the output of which in turn is connected to and displayed upon the oscilloscopic resonance detector. Only those signals with frequencies falling within the predetermined limits of 900 to 1100 cycles per second are passed without attenuation from the output of the filter 10 to resonance detector 14. Signals of all other frequencies are attenuated which, in effect, tends to separate the undesired from the desired signals. Inasmuch as the frequency of the article signals is within the pass band of band-pass filter 10, all of the article signal energy is passed to resonance detector 14 without attenuation. Alernatively, because the frequencies of the noise signals are randomly distributed throughout the frequency spectrum, most of the noise signal energy lies outside the pass band of band-pass filter 10 and is not passed to resonance detector 14. With this method and apparatus the oscilloscopic pattern of the undesired noise signals is eliminated or so reduced that the desired article vibration signals, as well as the required indication of resonance, are undistorted, orderly and clear. Having a clear indication of resonance, the natural frequency of resonance vibration of article 1 easily in determined by reading calibrated dial 7 of oscilaltor 6.

While substantially eliminating the bothersome and restricting effects of noise, admittedly filter 10 introduces what might be considered to be a limitation in the apparatus of the present invention. In regard to this potential limitation, it will be noted that certain of the claims of the reference patent recite either the following phrasing or its patentable equivalent:

". . . and means for cotninuously and instantaneously comparing the frequency of vibration of the body with the frequency of vibration of the audio oscillator over the entire range of adjustment of the oscillator, said means comprising an oscilloscope to one set of plates of which is fed the electrical output of the vibration detecting means, and to another set of plates of which is fed a portion of the output of the audio oscillator."

"Continuously and instantaneously comparing the frequency of vibration of the body with the frequency of vibration of the audio oscillator," as practiced and claimed in the reference patent, does have one advantage which is perhaps most clearly described on page 9 of the fourth listed reference, "Natural Frequency Vibration Tests," Non-Destructive Testing Handbook, volume II, section 51, quoted below:

"When the frequency of a preferred mode of vibration is unknown, yet within the range of the generator, the frequency spectrum is scanned from the lowest toward the highest frequency with the variable frequency generator. As the spectrum is scanned, the normally horizontal trace on the oscilloscope periodically forms various Lissajous patterns of four, three, or two loops lying along a horizontal line. This effect occurs because the output of the electromechanical driving system contains harmonics of the generator frequency in sufficient amplitude to excite the body at its natural frequency. This effect is helpful. For example, when a three-loop trace is observed, the generator can be set to three times its indicated frequency to produce resonance between the driving mechanism and the test body."

In the apparatus of the present invention, inclusion of filter 10 between "one set of plates" of the oscilloscopic detector and "the electrical output of the vibration detecting means" precludes "continuously and instantaneously comparing the frequency of vibration of the body with the frequency of vibrtaion of the audio oscillator." As the pass band of filter 10 purposely is limited to that width necessary to pass only frequencies of a predetermined mode of vibration of acceptable articles, and to attenuate all other frequencies, the frequencies of all other modes, overtones or harmonics of vibration will not pass the filter and enter the detector. As these frequencies cannot enter the detector, obviously it is impossible to continuously or instantaneously compare them with the oscillator frequency in the oscilloscopic detector.

In the early state of the art this may have been looked upon as a disadvantage or limitation, especially to technical personnel engaged in studying the application of the apparatus to their products. Although continuously and instantaneously comparing the article and oscillator frequencies as practiced and claimed in the reference patent mandated the generation of many complicated oscilloscopic Lissajous patterns, the technical personnel were sufficiently skilled to correctly interpret the patterns.

In the present state of the art, however, the apparatus is more widely used by relatively unskilled production personnel. Inclusion of the filter, which eliminates all but the more simple indications of resonance easily identified by unskilled personnel, now may be looked upon as an advantage.

Another modification of a preferred embodiment of the present invention is shown in the drawing and will be described. In the previous modification, resonance detector 14 took the form of a cathode ray oscilloscope with vertical and horizontal inputs taken from filter 10 and oscillator 6, respectively. In the present modification, however, detector 14 takes a different form. In this arrangement, the output of filter 10 is connected by lead wire 13 to the input of resonance detector 14 as shown. The connection between oscillator 6 and detector 14, provided in the former instance by solid and dashed sections of lead wire 5, is not required and the dashed section of lead wire 5 may be disconnected or eliminated. In this instance, detector 14 takes the form of a simple voltage-actuated meter, the input to which is connected to the output of transducer 8 through filter 10 as shown. Resonance detector 14 conveniently may be a Model 400D Vacuum Tube Voltmeter manufactured by the aforementioned Hewlett-Packard Company, for example. Detector 14 is provided with indicating meter 15 arranged to indicate the relative amplitude of the voltage applied through lead 13. The latter voltage is equal to the voltage output of transducer 8, as modified by filter 10, and, hence, is proportional to the amplitude of vibration of article 1. As fully described in the reference patent, specifically beginning in column 8, line 68, the amplitude of vibrations of the article under test maximizes at resonance. Hence, in this modification, the indication of resonance occurs at the peak swing of meter 15 of resonance detector 14. At this point the natural frequency of resonance vibration of article 1 may be read from calibrated dial 7 of oscillator 6. As in the previous modification, band-pass filter 10 similarly isolates resonance detector 14 from undesired noise signals.

While neither illustrated nor described in the reference patent, this "relative amplitude" meter has the advantage that it permits the apparatus to be used to determine the "damping factor" or "logarithmic decrement" of the article under test in addition to its natural frequency of resonance vibration. To perform this determination, article 1 may be placed in position as before and oscillator 6 tuned with dial 7 to the natural frequency of resonance vibration of the article indicated by the peaking of meter 15 of detector 14. This frequency is measured, as by reading the calibrated dial of oscillator 6, and recorded as "$f(0)$." By adjusting either the sensitivity of the meter or the amplitude of vibration of article 1, the meter is caused to read 100 units, corresponding to 100 units of vibrational amplitude. Next, the frequency of oscillator 6 is detuned to the low-frequency side of resonance until the meter reading falls to 70.7 units. At this point the frequency is recorded as "$f(1)$." In turn, the frequency of oscillator is detuned to the high-frequency side of resonance until the meter reading again falls to 70.7 units. This frequency is recorded as "$f(2)$." The damping factor of article 1 then may be calculated by substituting the recorded frequencies and solving the following expression:

$$\text{Damping Factor} = \frac{f(2) - f(1)}{f(0)}$$

Still another modification of a preferred embodiment of the invention is illustrated in the drawing and will be described. In the figure there is shown electronic frequency counter 16, well known in the art of frequency measurement. Conveniently, counter 16 may be a Model 521–A Industrial Frequency Counter manufactured by the aforementioned Hewlett-Packard Company, for example. The frequency counting input of counter 16 is shown connected by lead wire 17, switch 18 in position A and dashed and solid sections of lead wire 5 to the output of oscillator 6. Alternatively, the frequency counting input of counter 16 may be connected through lead wire 17, switch 18 in position B and the dashed and solid sections of lead wire 13 to the output of filter 10.

With switch 18 in position A, the circuit is arranged so that counter 16 may count and indicate the output frequency of oscillator 6. This is the vibration forcing frequency applied through transducer 4 to article 1. The vibration forcing frequency is equal to the natural frequency of resonance vibration provided that oscillator 6 is precisely tuned to resonance with the natural frequency of vibration of article 1. Alternatively, with switch 18 in position B, the circuit is arranged so that counter 16 may count and indicate the frequency of the signal at the output of filter 10. This is the actual frequency of vibration of article 1. Provided that oscillator 6 is not precisely tuned to resonance with the natural frequency of vibration of article 1, this connection affords a somewhat higher degree of accuracy in determining the frequency of article 1. This is because article 1 will tend to vibrate at its natural frequency of resonance vibration even though the forcing frequency may be slightly off tune.

When using the frequency counter to measure directly the actual frequency of vibration of article 1, as in the connection last described, filter 10 offers a distinct advantage. Random noise impulses converted by transducer 8 to random electrical impulses are filtered from the article vibration signals by filter 10 prior to their arrival at the counter. Thus, the random electrical impulses are not counted by counter 16 and cannot cause errors in the frequency count of the article vibration signal.

A further modification of the invention is illustrated in the drawing and will be described. For this modification, dial 7 of oscillator 6 is shown coupled by dashed connection 19 to dials 11 and 12 of filter 10. This connection is illustrative of a methodological, functional or physical relationship between oscillator 6 and filter 10 which may be accomplished, for example, by the mechanical interconnection of the dials thereof as indicated in the drawing. Thus, rotation of any one of the dials simultaneously causes rotation of the others. As dial 7 of oscillator 6 is rotated to produce progressively different oscillator output frequencies, for example, dials 11 and 12 of filter 10 simultaneously rotate to adjust filter 10 to attenuate and to pass different frequencies. In this modification, filter 10 may be operated either in the "variable bandpass" filter mode or the "variable single-frequency" filter mode described hereinbefore. This latter mode has the advantage that the pass band is reduced to the minimum possible width for the maximum possible attenuation and rejection of noise signal energy.

A requirement of this modification of the invention is that either the center frequency of the frequency band, or the single frequency, passed by the filter be substantially the same as, or "track," the output frequency of oscillator 6 over the entire frequency range needed. It will be apparent to those versed in the art that the tracking requirement may be met by interconnecting the dials of the oscillator and filter wtih selected gears or belts and pulleys of suitable ratio. On the other hand, I have found it advantageous to combine the oscillator and filter into a single, unitized electronic instrument which I prefer to call a "Tracking Variable Frequency Oscillator and Filter." Those versed in the art will appreciate the fact that the tunable frequency-determining elements of feedback-type oscillators, such as suggested for oscillator 6, may be tunable resistance-capacitance or inductance-capacitance combinations also useful in tunable filters such as filter 10. The resistance, capacitance or inductance of the variable elements of such combinations are adjustable or "tunable," as by the rotation of a shaft, such that the exact resistance, capacitance or inductance is proportional to the angular displacement of the shaft. Hence, the variable, frequency-determining elements for both the oscillator and filter may be ganged to a single dial. The dial may be calibrated in cycles per second, for example.

Testing procedure with the apparatus of this modification of the invention is similar to that of the other modifications, except that filter 10 is not adjusted to fixed, predetermined low and high frequency limits. Rather, in the variable band-pass mode, filter 10 cooperates with oscillator 6 to pass substantially without attenuation those signals in a frequency band centered on and tracking the output frequency of oscillator 6. Stated in another way, filter 10 cooperates with oscillator 6 substantially to attenuate signals of all frequencies other than those within a predetermined frequency band centered on and tracking the output frequency of oscillator 6.

On the other hand, in the variable single-frequency mode, filter 10 cooperates with oscillator 6 substantially to pass without attentuation only those signals of a frequency equal to the output frequency of oscillator 6. Stated in another way, filter 10 cooperates with oscillator 6 substantially to attenuate signals of all frequencies other than those equal to the output frequency of oscillator 6. As the pass-band is reduced to minimum width, theoretically zero cycles per second, this latter mode of operation might be recommended for exceptionally noisy areas.

With reference to all of the modifications described, the apparatus of the present invention cooperates to reduce the sensitivity of the test to noise of an acoustical, vibrational, or even electrical, nature. An example of the latter might be hum induced in the electrical circuits from the power mains. Because of reduced sensitivity to noise, the vibrations of articles may be detected even when they are of very low amplitude. Thus, lower powers and less expensive components may be used to excite useful vibrations in the articles to be tested.

While I have illustrated and described in detail several modifications of a preferred embodiment of my invention, I am aware that various changes may occur to those versed in the art without departing from the invention Therefore, it is aimed in the appended claims to cover any and all changes or modifications which fall within the true spirit and scope of the invention.

I claim:

1. In an apparatus for testing articles according to natural frequencies of resonance vibration thereof, means to support an article for vibration, means to produce vibration in said article from electric signals, means to derive electric signals from vibrations of said article, means to detect resonance vibrations in said article, and tracking variable-frequency oscillator and band-pass filter means arranged to produce a single frequency signal adjustable over a frequency range and to attenuate all signals except those in a band of frequencies centered around and tracking said single frequency signal, said oscillator connected to said vibration-producing means and said filter connected between said signal-deriving means and said resonance-detecting means whereby signals outside said band of frequencies are diverted from said resonance-detecting means.

2. In apparatus for testing articles according to natural frequencies of resonance vibration thereof, means to support an article for vibration, means to produce vibration in said article from electric signals, means to derive electric signals from vibrations of said article, means to detect resonance vibrations in said article, and tracking variable-frequency oscillator and by-pass filter means arranged to produce a single frequency signal adjustable over a frequency range, to indicate the frequency thereof, and to attenuate all signals except those in a band of frequencies centered around and tracking said single freqeuncy signal, said oscillator connected to said vibration-producing means and said filter connected between said signal-deriving means and said resonance-detecting means whereby signals outside said band of frequencies are diverted from said resonance-detecting means.

3. In an apparatus for testing articles according to natural frequencies of resonance vibration thereof, means to support an article for vibration, means to produce vibration in said article from electric signals, means to derive electric signals from vibrations of said article, means to detect resonance vibrations in said article, means to measure the frequency of electric signals, and tracking variable-frequency oscillator and band-pass filter means arranged to produce a single frequency signal adjustable over a frequency range and to attenuate all signals except those in a band of frequencies centered around and tracking said single-frequency signal, said oscillator connected to said vibration-producing means and said signal-deriving means connected through said filter means to said resonance-detecting means and to said frequency-measuring means whereby signals outside said band of frequencies are diverted from both said latter means.

4. In an aqueous for testing articles according to natural frequencies of resonance vibration thereof, means to support an article for vibration, means to produce vibration in said article from electric signals, means to derive electric signals from vibrations of said article, means to detect resonance vibrations in said article, and tracking variable-frequency oscillator and band-pass filter means arranged to produce a single frequency signal adjustable over a frequency range and to attenuate all signals except said adjustable single frequency signal, said oscillator connected to said vibration-producing means and said filter connected between said signal-deriving means and said resonance-detecting means whereby signals of frequencies other than said adjustable single frequency are diverted from said resonance-detecting means.

References Cited

UNITED STATES PATENTS

| | | | |
|---|---|---|---|
| 2,393,225 | 1/1946 | Andalikiewicz | 73—67.2 |
| 2,403,999 | 7/1946 | Read et al. | 73—67.2 |
| 2,486,984 | 10/1949 | Rowe | 73—67.2 |
| 2,576,423 | 10/1951 | Stewart | 73—67.2 |
| 2,675,698 | 4/1954 | Johnson | 73—67.2 |
| 2,782,633 | 2/1957 | Stauss et al. | 73—67.2 |
| 2,921,465 | 1/1960 | Cook | 73—67.8 |
| 3,003,628 | 10/1961 | Diamond et al. | |

OTHER REFERENCES

Crissman, J. M. et al., Apparatus for Measuring the Dynamic Mechanical Properties of Polymeric Materials between 4° and 300° K., The Journal of the Acoustical Society of America, vol. 34, No. 11, November 1962, pages 1703–1706.

RICHARD C. QUEISSER, *Primary Examiner.*

JAMES GILL, *Examiner.*

J. P. BEAUCHAMP, *Assistant Examiner.*